June 12, 1934.  J. S. BAKER  1,962,292

DRAFT CONTROLLER

Filed Nov. 26, 1930   3 Sheets-Sheet 1

Inventor:
John S. Baker
By Jones, Addington, Ames & Seibold
Attys.

June 12, 1934.   J. S. BAKER   1,962,292
DRAFT CONTROLLER
Filed Nov. 26, 1930   3 Sheets-Sheet 2
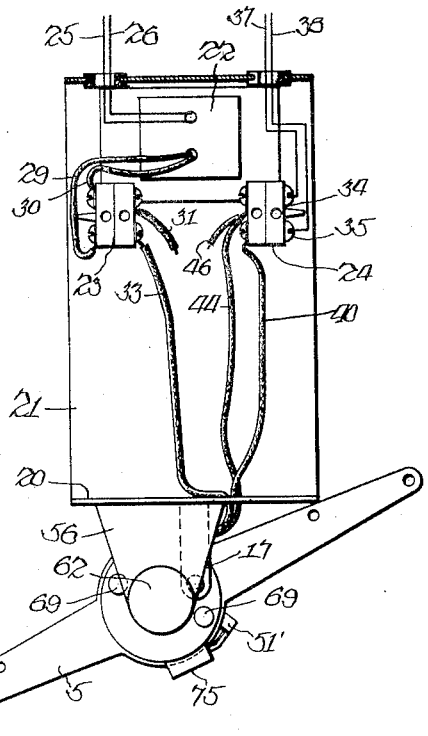
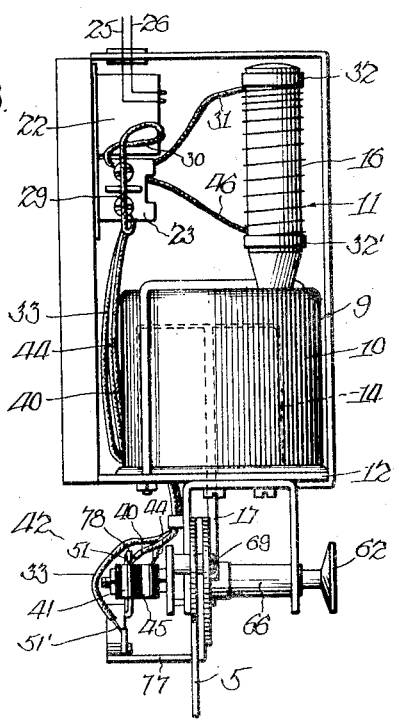
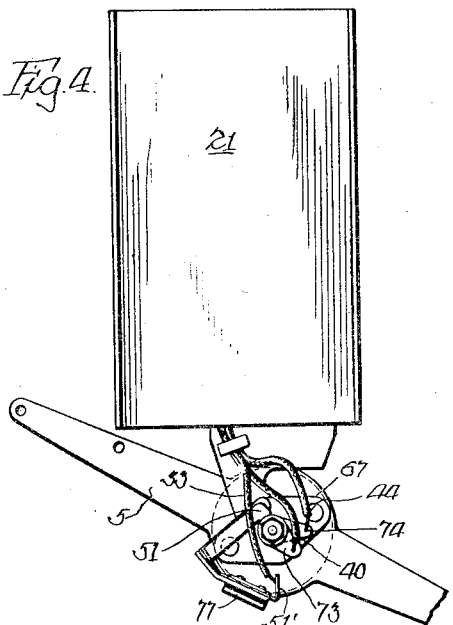
Inventor:
John S. Baker June 12, 1934. J. S. BAKER 1,962,292
DRAFT CONTROLLER
Filed Nov. 26, 1930 3 Sheets-Sheet 3
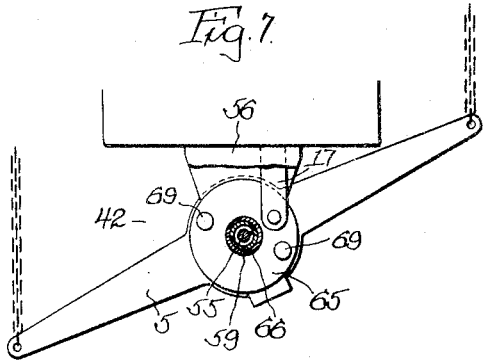
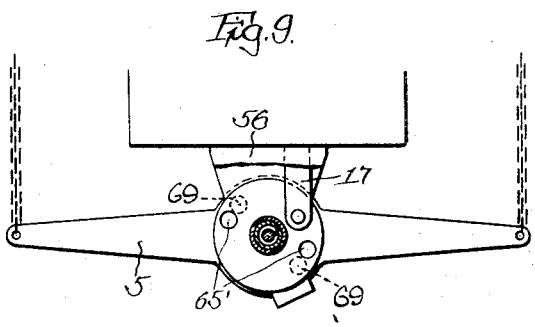
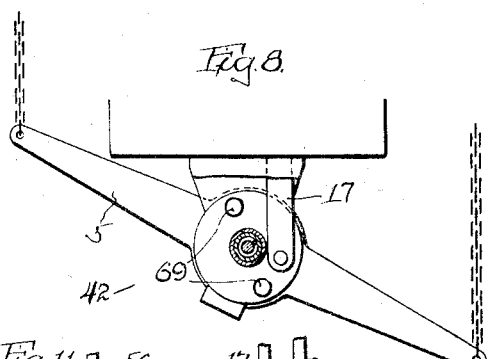
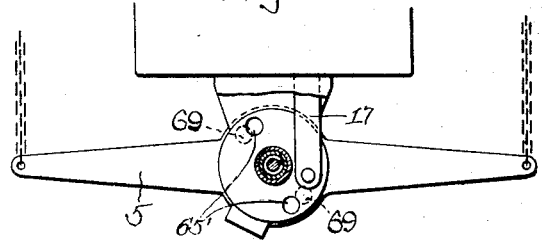
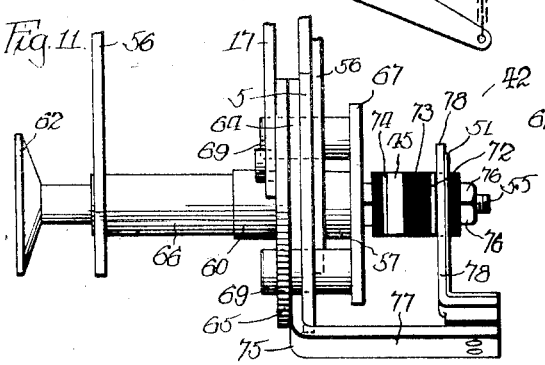
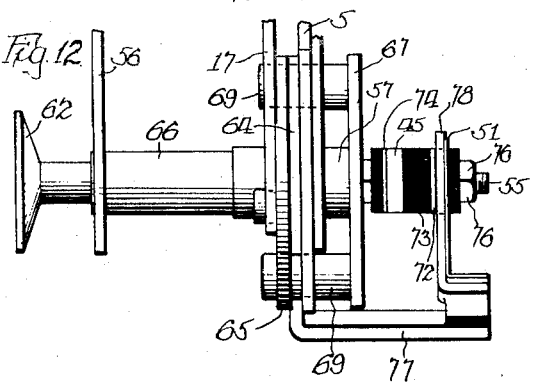
Inventor:
John S. Baker Patented June 12, 1934

1,962,292

UNITED STATES PATENT OFFICE 1,962,292

DRAFT CONTROLLER

John S. Baker, Chicago, Ill., assignor to Cook Electric Company, Chicago, Ill., a corporation of Illinois Application November 26, 1930, Serial No. 498,414

8 Claims. (Cl. 236—16)

My invention relates to electric draft controllers for heating systems designed to operate by any form of electrical means and controlled automatically by suitable means, which may be thermostatically or otherwise.

Usually, in heating systems for homes and the like, electric draft controllers are employed to actuate the draft and check dampers of the heater. A recent development of this type of controller provides for discontinuing the automatic control of the electrical means over the damper lever mechanism, during firing operation, so that one or both of the dampers may be closed. The construction included a clutch connection requiring manual disengagement and automatic re-engagement of the clutch-engaging parts against the weight or pull of the lever arms, including the pull exerted upon them by the dampers themselves.

An object of this invention is to provide for a controller of the type described having clutch connecting means which may engage or re-engage the lever mechanism without being influenced by the weight or pull of the lever arms, or the weight or pull exerted upon them by the dampers or other connecting parts.

A further object of the invention is to provide a clutch connection having means movable relative to the lever mechanism or damper actuating member to make and break the interlock between it and the electrical means of the controller.

Many other objects and advantages of the invention will be apparent from the following detailed description when taken in connection with the accompanying drawings which form a part hereof.

In the drawings:

Fig. 2 is a view of the rear wall of the controller illustrating certain circuit connections;

Fig. 3 is an elevation of one side of the controller;

Fig. 4 is a view of the rear of the controller;

Fig. 7 is a detailed front view partly in section illustrating the thermostat short-circuiting switch and the clutch connection, the damper lever being shown in full lines and in non-heating or "off" position;

Fig. 8 is a similar view illustrating the damper lever in heating or "on" position;

Fig. 9 is a similar view illustrating the clutch connection disengaged, the thermostat short-circuiting switch closed, and the damper lever manually moved from its "off" position, when the room thermostat is open, to horizontal position to close one or both of the dampers;

Fig. 10 is a similar view illustrating the clutch connection disengaged, the thermostat short-circuiting switch open, and the damper lever moved from its "on" position, when the room thermostat is closed, to a horizontal position to close one or both of the dampers;

Fig. 11 is a side elevational view of thermostat short-circuiting switch and the clutch connection when the damper lever is in its "off" position, as shown in Fig. 7;

Fig. 12 is a similar view when the damper lever is in its "on" position, as shown in Fig. 8;

Fig. 13 is a similar view of this mechanism when the damper lever is moved from its "off" position to a horizontal position, as shown in Fig. 9;

Fig. 14 is a similar view of this mechanism when the damper lever is moved from its "on" position to a horizontal position, as shown in Fig. 10.

Figure 1:
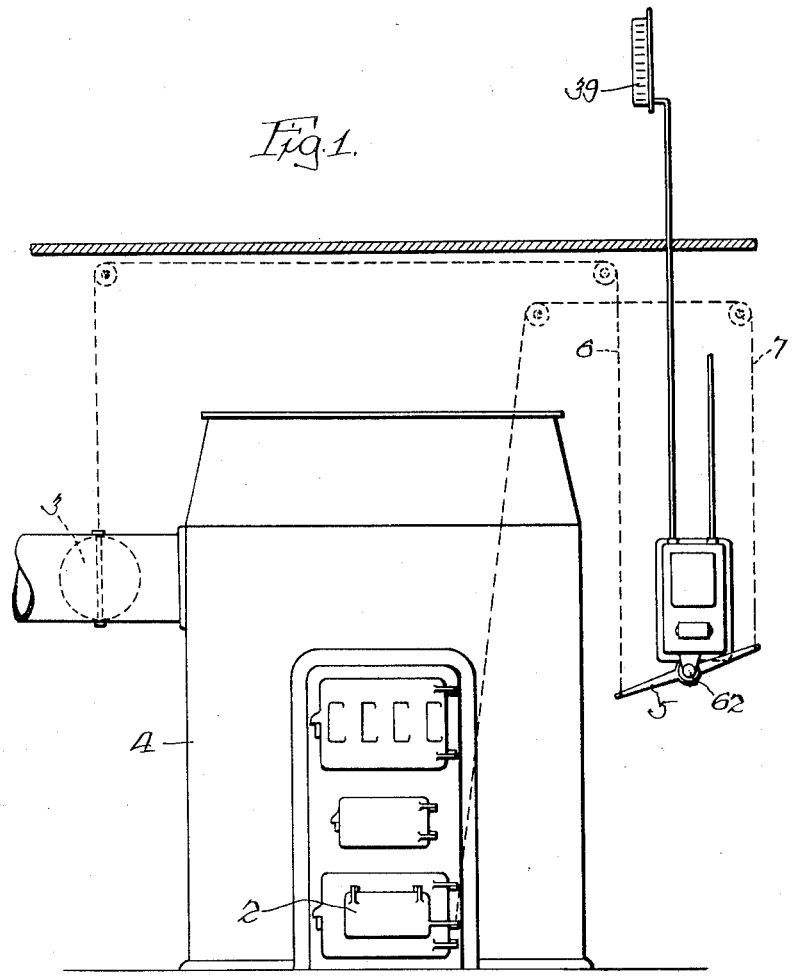
Figure 1 is a view illustrating the front portion of a furnace or heater with the structure embodying my invention applied thereto.

My invention, as embodied in the structure shown in the drawings, comprises an electric draft controller which may be applied to various types of heaters or furnaces having the usual air inlet damper 2 and the check damper 3.

In the drawings, I have illustrated a furnace, being designated 4, but it will be understood that in so far as the disclosure of my invention is concerned, the illustration is merely conventional, inasmuch as the invention is capable of wide application in this field and may be used to control elements other than the dampers of heaters such as oil valves, gas valves, etc. The electric draft controller is provided with a damper lever 5, mounted preferably in pivotal relation at the bottom of the controller and having the ends of its arms perforated to permit attachment of suitable connections to the dampers 2 and 3. The left-hand arm of damper lever 5 may be connected to check damper 3 by a chain or other suitable connection 6, while the right-hand arm of damper lever 5 may be connected to air inlet damper 2 by a chain or other suitable connection 7. The arrangement permits the dampers to be in closed position when damper lever 5 is in a horizontal position, as illustrated in Fig. 1. Movement of damper lever 5 clockwise raises the left-hand arm to close check damper 3 and lowers the right-hand arm to open air inlet damper 2. Counterclockwise movement of damper lever 5 to the extreme opposite position closes air inlet damper 2 and opens check damper 3. The particular illustration of the use to which my invention has been put may obviously be varied, including the relative arrangement or construction of the lever arms with respect to each other, without altering the operation of the controller to be presently described, which controller embodies certain important features of the invention.

Any suitable actuating mechanism may be provided, as part of the electric draft controller, for operating damper lever 5. It will be understood that while thermally-operated element or vapor motor 9 is illustrated, any suitable electrical mechanism or motor may be used instead in connection with the invention disclosed herein. Thermal element 9 may comprise a rigid outer wall 10 and an expansible and contractible inner wall 14, suitably sealed together in hermetical relation at the lower end and fastened to base 12 of the housing of the controller. A tube 16, provided with a heat coil 11, is closed at its top and communicates with the interior of a closed chamber provided by outer and inner walls 10 and 14. An actuating arm 17 extends through base 12 and into inner wall 14, being operably connected to the top of the inner wall.

Figure 15:
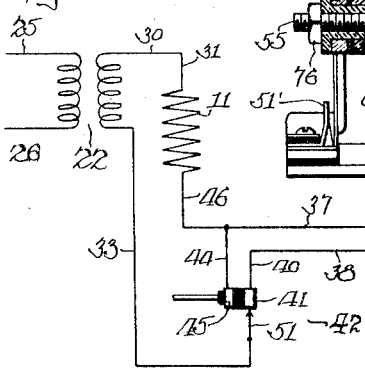
Fig. 15 is a wiring diagram of the controller.

The controller housing includes a vertical wall plate 21 (Fig. 3) carrying any suitable form of transformer 22, if so desired, and terminal blocks 23 and 24. Primary coil of transformer 22 is adapted to receive line wires 25 and 26, which wires are continued at 29 and 30, from the secondary coil of transformer 22 to terminal block 23. Wire 31, comprising a continuation of the circuit from wire 30 through terminal block 23, may connect to a terminal band 32 (Fig. 3) surrounding and suitably attached at the upper end of tube 16. Heat coil 11 may be attached at its upper end to terminal band 32. Wire 33 of the opposite side of secondary coil of transformer 22, forming a continuation of the circuit by electrically connecting to wire 29 at terminal block 23, connects to a substantial stationary contact 51, this connection being illustrated more clearly at 51' in Fig. 3. Wire 37 connects to a terminal 34 of terminal block 24 and leads to a thermostat 39 shown in Fig. 15. This thermostatic circuit is completed by a wire 38, connecting to a terminal 35 on terminal block 24, and then by wire 40 leading from the opposite side of terminal 35 to a movable contact 41, which forms part of the clutch-operated short-circuiting switch 42. At the opposite side of terminal block 24, wire 37 continues as wire 46 to a lower terminal band 32' surrounding and suitably attached to the lower end of tube 16, to which heat coil 11 is also attached. Wire 37 also continues as wire 44 to a movable contact 45, also forming part of the clutch-operated short-circuiting switch 42.

The closed chamber defined by the space between outer wall 10 and inner wall 14, as well as the interior of tube 16, is adapted to contain a volatile fluid, which, when heated, will develop a pressure to move actuating arm 17 downwardly. Such movement operates damper lever 5 clockwise, whereby to open air inlet damper 2 and to close check damper 3. This action normally occurs when the heating circuit is closed by the closing of room thermostat 39 upon lowering of the temperature in the room.

The normal heating circuit may be traced as follows: From the wire 30 of the secondary coil to terminal block 23, wire 31 to terminal band 32, heat coil 11 to lower terminal band 32', continuing through wire 46 to terminal 34, through wire 37, thermostat 39, wire 38, terminal 35, through wire 40 to stationary contact 51 and movable contact 41, and returning by wire 33 to the other side of the secondary coil of transformer 22. The current flowing through heat coil 11 develops heat at tube 16 to vaporize and drive a volatile substance into the closed chamber of thermal element 9, whereby to expand the chamber and move actuating arm 17 downwardly. Coil 11 about tube 16 forms or establishes a heating zone. When the volatile substance is driven out of this heating zone into the closed chamber, further expansion thereof is checked. This movement of actuating arm 17 rotates the damper lever in a clockwise direction, as shown in Fig. 8, to open air inlet damper 2 and to close check damper 3. Air supplied to heater 4 by way of air inlet damper 2 supports combustion within the heater whereby the room temperature will rise and room thermostat 39 will open. Tube 16 then cools and the vapor condenses to allow the volatile substance to return into tube 16. The closed chamber will return to normal position, and the upward movement of actuating arm 17 will rotate damper lever 5 counterclockwise (see Fig. 7) whereby air inlet damper 2 is closed and check damper 3 is opened.

During the firing of furnace 4, it may be desirable to close one or both dampers and check the draft. Temporarily disconnecting chains 6 and 7 to accomplish this result should not be permitted because it is possible that the attendant will forget to reconnect these chains to restore automatic control. The clutch-operated short-circuiting switch 42 allows damper lever 5 to be manually disconnected from the controller so as to be moved to a horizontal position, or other position necessary, to close one or both dampers, and simultaneously to close the heating circuit of the thermal element, if the room thermostat 39 is open, in order that the controller may thereafter operate to return the damper or dampers to their "off" position, as shown in Fig. 7. Short-circuiting switch 42 also operates in this case in a manner not to close the circuit when the room thermostat is closed and damper lever is in an "on" position (Fig. 8) to prevent permanently closing the heating circuit. In short, therefore, the function of switch 42 is to control the operation of the mechanism so that the controller will return damper lever 5 to its former position after the dampers 2 and 3 have been permitted to remain closed a sufficient length of time after the firing of the furnace, irrespective of the status of the room thermostat 39.

As previously mentioned, short-circuiting switch 42 comprises movable contacts 41 and 45 and a relatively stationary contact 51 adapted to engage the movable contacts. By the arrangement shown, stationary contact 51 preferably has three positions as the result of the movement of contacts 41 and 45. By referring to Fig. 15, it will be noted that when stationary contact 51 is in its normal position of engagement with movable contact 41, the circuit is completed from the secondary coil of transformer 22, through this stationary contact 51, movable contact 41, thermostat 39, through the heat coil 11 to the opposite side of the secondary coil of transformer 22. This condition exists during the normal automatic operation of the control.

In the event it is desired to move damper lever 5 to a horizontal position, while contact 51 is in engagement with movable contact 45, and thermostat 39 is closed, current flowing, of course, through heat coil 11, heat being generated to operate thermal element 9, whereby to hold damper lever 5 in the position shown in Fig. 8, a clutch button 62 is operated, and, as specifically shown, depressed, as will be presently described, until the clutch connection with damper lever 5 is broken, whereupon this damper lever will quickly move to horizontal position under the weight or pull of the damper doors. Contact 51 is disengaged from contact 41, and insulation collar 73 is brought into engagement therewith. The circuit is broken, and consequently, heat coil 11 is caused to cool. The result is that movable contact 41 is returned, by the contraction of the thermal element, into engagement with contact 51 to restore the automatic control of the controller over damper lever 5.

In the event it is desired to move damper lever 5 to a horizontal position when thermostat 39 is open and current is not flowing through heat coil 11, clutch button 62 is depressed, which releases damper lever 5 and allows it to move into horizontal position, under the weight or pull of the damper doors. This brings movable contact 45 into engagement with stationary contact 51. Current then flows from the secondary coil of transformer 22 through stationary contact 51, movable contact 45, wires 44 and 46, heat coil 11, to the opposite side of the secondary coil of this transformer. The heat developed at coil 11 will operate thermal element 9 to move damper lever 5 counterclockwise until the clutch connection is again established, whereupon, as will be later explained, the circuit is broken by movable contact 45 disengaging stationary contact 51.

Damper lever 5 is preferably carried in pivotal relation on a shaft 55, through a rotatable bushing 57 fixed to the lever and suitably carried for rotative movement in one of the depending arms of a bracket 56 suspended from the underside of base 20 of the controller housing.

Figure 5:
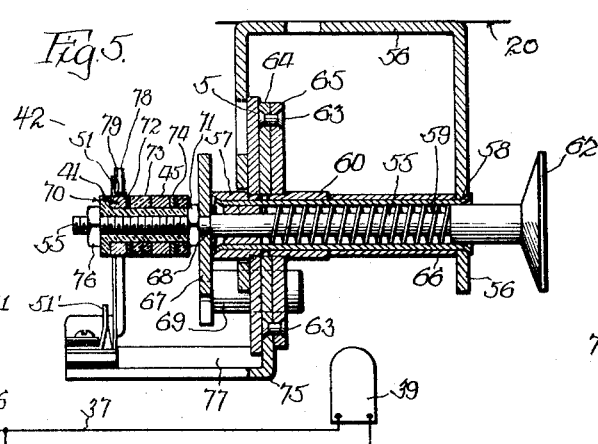
Fig. 5 is an enlarged vertical sectional view of the thermostat short-circuiting switch and the clutch connection between the roller and the damper lever.

Referring to Fig. 5, a bearing tube 58 is carried by the other depending arm of bracket 56, so as to extend rearwardly through bushing 57, thereby forming a housing for a coil spring 59 carried on shaft 55. A bushing 60 rotates upon bearing tube 58. Fixed to bushing 60 are a disc 65 and the vertical arm 64 of a bracket 75, which are secured together as a unit by rivets 63. A spacing tube 66 is provided upon bearing tube 58 to keep bushing 60 in proper position. A clutch plate 67 is fixed at 68 to shaft 55 and moves with this shaft. Clutch plate 67 has two clutch pins 69 fixed thereto to move therewith. Any number of pins 69 may serve the purpose equally well. Disc 65 and lever 5 each has corresponding openings therein for receiving the clutch pins 69. These clutch pins engage in these openings to cause the parts mentioned to operate as a unit, including vertical bracket leg 64 fixed to disc 65, when lever 5 is under the normal automatic control of the motor.

The rear end of shaft 55 is reduced and threaded to receive an insulation bushing 70. A nut 71 preferably separates clutch plate 67 from the end of bushing 70. Movable contacts 41 and 45 are carried upon bushing 70 and are separated by an insulation collar 73. Suitable conductor connectors 72 and 74 are provided upon bushing 70 to make the proper electrical connections for wires 40 and 44, furnishing current to movable contacts 41 and 45. A nut 76 serves to lock these parts in position upon the threaded end of shaft 55.

Horizontal leg 77 of bracket 75 carries movable contact 51 at its extreme outer end. Suitable insulation spacers and plates are furnished to carry this movable contact 51, conductor clip 51' being provided to receive wire 33. Contact 51 is preferably formed of spring material. It is guided and somewhat reinforced by a plate 78. The vertical portion of contact 51 is furnished with an angularly formed lip 79, which is adapted to slide upon movable contacts 41 and 45 to complete the circuit.

Figure 6:
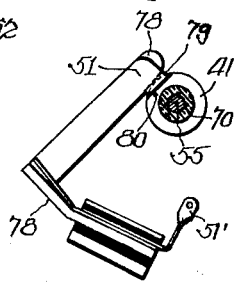
Fig. 6 is a detailed view of one of the contacts of the thermostat short-circuiting switch.

In order to effect a quick make and break of contact 51 when the circuit connections are changed from either of the movable contacts 41 and 45, and to be sure that the thermostat retains control of the motor until the clutch is completely disengaged and the lever 5 initially moves, the peripheral surface of movable contact 41 is cut away, as indicated at 80, in Fig. 6, so that the connector 72 adjacent thereto will form a shoulder 81 against which lip 79 will abut. When button 62 is depressed, contacts 41 and 45 will move rearwardly, but the lip 79 will abut against the shoulder of conductor 72 of contact 41, until contact 45 is substantially opposite the member 78. Contact 51 being of spring material, tends to resist such movement by virtue of its engagement with shoulder 81, but it will spring into its position against member 78 and into engagement with contact 45 when the rotary movement of the lever 5 to horizontal position will carry with it the parts of the switch 42 on shaft 55, including connector 72, which action causes shoulder 81 to revolve away from and release lip 79 and its contact 51. The position of contact 51 before it is released and caused to spring into position of engagement with contact 45 is shown in dotted lines in Fig. 13. In this view, the manner in which conductor 72 forms a shoulder 81 to hold lip 79 from being released of its engagement with contact 41, as it is moved rearwardly, will be also clearly seen. From the description given of the clutch-operated short-circuiting switch 42, it will be obvious that damper lever 5 may move independently of disc 65 and bracket leg 64 upon manual disengagement of the clutch.

Assume now that the thermostat is closed and calls for heat at the furnace. Current flows through heat coil 11 and causes thermal element 9 to actuate whereby to depress actuating arm 17 and to rotate disc 65 clockwise. Damper lever 5 will be also rotated clockwise to the position shown in Fig. 8, whereupon air inlet damper 2 will be open and check damper 3 will be closed. When the room temperature reaches the predetermined setting on thermostat 39, the latter opens and discontinues the flow of current through heat coil 11. Thermal element 9 will then operate in the opposite direction to raise actuating arm 17 and rotate disc 65 counterclockwise. Counterclockwise movement of disc 65 returns damper lever 5 to the position shown in Fig. 7.

Assume now that with the thermostat in open position and with air inlet damper 2 closed and check damper 3 open, the attendant desires to fire furnace 4. Button 62 is depressed by the attendant until clutch pins 69 disengage the openings 65' in disc 65 and move rearwardly out of the path of leg 64, whereupon the weight or pull of the dampers upon lever 5 will move the lever to a horizontal position, as shown in Fig. 9. When button 62 is depressed, contact 41 is moved rearwardly and contact 45 is thereby brought into alignment with member 78 of the stationary contact 51, but the contact 51 is of spring material, and its lip 79 tends to cling against the shoulder 81 formed by connector 72, as shown in dotted lines in Fig. 13, this being the result of the cut-away portion 80 on contact 41, providing for a flat contact surface with lip 79. However, when clutch pin 69 disengages bracket arm 64 of bracket 75 carrying contact 51, and also the disc 65 to which the motor is connected by actuating arm 17, movement of the lever arm to horizontal position causes clutch pin 69 to revolve and consequently shaft 55. This movement of shaft 55 revolves contact 41 until its flat surface rides out of engagement with lip 75, thereby removing shoulder 81 furnished by connector 72. Removing this shoulder 81 allows lip 79 immediately to free itself, and the contact 51 will spring back into vertical position, thereby to engage movable contact 45. The heating circuit of coil 11 is then closed, and the current will flow from the secondary coil of transformer 22 through wire 33, contact 51, movable contact 45, wires 44 and 46, and through heat coil 11 to the opposite side of the secondary coil. Heat developed at heat coil 11 will actuate thermal element 9 and cause actuating arm 17 to be actuated whereby to rotate disc 65 clockwise in the same manner as above described. This clockwise rotation of disc 65 brings clutch pin holes 65' in disc 65 into alignment with clutch pins 69, whereby coil spring 59 causes these clutch pins to engage in said holes to lock disc 65 to the damper lever 5. This reengagement of damper lever 5 with disc 65 releases contact 51 from engagement with contact 45, and causes contact 51 to engage 41 instead. The circuit is, however, broken by virtue of the fact that thermostat 39 is open. Damper lever 5 will return to the position shown in Fig. 7 and air inlet damper 2 will again be closed and the check damper 3 will be again opened.

Assume now that the attendant desires to fire the boiler while room thermostat 39 is closed and the damper lever 5 is in the position shown in Fig. 8. Button 62 is depressed, but in view of the counterclockwise movement now of damper lever 5, the clutch pins may move in the same direction without abutting against the side edges of vertical bracket arm 64. Accordingly, the button is not depressed the same distance, but only a part of the distance, as illustrated in Fig. 14. The weight or pull of the damper doors will move the damper lever 5 to a horizontal position. Partial depression of button 62 will move contact 41 out of engagement with contact 51 and bring insulation collar 73 into engagement with contact 51, thereby breaking the heating circuit. Thermal element 9 will then cool and rotate disc 65 counterclockwise sufficient to bring the clutch pin holes in this disc into engagement with the clutch pins 69. This causes the shaft 55 to move outwardly and to bring movable contact 41 again into engagement with contact 51, thereby closing the circuit if during this time the room thermostat 39 is still closed. Heat will again develop at heat coil 11 to actuate thermal element 9 and again rotate damper lever 5 clockwise to the position shown in Fig. 8 until the room thermostat is again open.

It will be accordingly observed that a structure is provided herein in connection with the electric draft controller permitting damper lever 5 to be moved to a horizontal position whereby to close one or both dampers irrespective of the condition of room thermostat 39. If room thermostat 39 is closed, short circuit switch 42 functions to open the circuit temporarily, while damper lever 5 is in horizontal position and the dampers are closed, but opening the circuit at this time will cause the thermal element to actuate and to again engage the clutch connection between the damper lever 5 and the controller whereby again to close the circuit and allow the thermal element to return the damper lever to its clockwise position. On the other hand, if room thermostat 39 is open, short circuit switch 42 closes the circuit to cause thermal element 9 to actuate so that after the furnace has been fired, damper lever 5 will be returned from its horizontal position to its "off" position and the heating circuit again open.

This case more particularly discloses a novel form of clutch between damper lever mechanism 5 and the motor, or other actuating means employed, whereby the engaging and disengaging operations of the clutch are accomplished without the clutch parts being influenced by weight or pull of the lever arm mechanism or the weight or pull exerted upon them by dampers or other connecting parts. The arms of the lever 5 are shown integrally formed, but it will be understood that in so far as the principle of operation of the clutch is concerned, the manner in which the lever is constructed is immaterial. The clutch provides disengaging means movable relative to the damper lever, thereby providing a simpler and more easily operated clutch.

Without further elaboration, the foregoing will so fully explain the gist of my invention, that others may, by applying current knowledge, readily adopt the same for use under varying conditions of service, without eliminating certain features, which may properly be said to constitute the essential items of novelty involved, which items are intended to be defined and secured to me by the following claims.

I claim:

1. In an automatic damper control, a damper lever having arms each adapted to be connected to a separate damper, automatic control operating means for normally moving said lever to on and off positions, and means movable relative to said lever for discontinuing automatic control over said lever by said operating means whereby to effect a closing movement of at least one of said dampers.

2. In combination with a motor, a damper lever automatically operated by said motor for movement to on and off positions, and a depressible button having an operable part movable relative to said lever adapted to release said lever from the control of said motor for independent operation of said lever, and means for automatically restoring the control of said motor over said lever.

3. In an automatic damper control, a motor, a damper lever having arms each adapted to be connected to one or more different dampers and automatically operated by said motor to open and close said dampers, and a clutch device having a part movable relative to said lever for disengaging said lever from the control of said motor whereby said lever may operate to close one of said dampers.

4. In an automatic damper control, a thermostat responsive to temperature variation, a motor, the operation of which is controlled by the thermostat, a furnace, damper mechanism controlling the furnace operation, actuating means automatically operated by the motor for controlling the damper mechanism, a clutch device for releasing the actuating means from its engagement with the motor and for temporarily discontinuing the control of the thermostat over the motor, and means for preventing the release of said thermostatic control over said motor from becoming effective until the release of said actuating means by said clutch device is completed.

5. In an automatic damper control, a thermostat responsive to temperature variations, an electric motor, the operation of which is controlled by the thermostat, a furnace, damper mechanism controlling the furnace operation, a lever automatically operated by the motor for controlling the normal operation of the damper mechanism, an electric switch in circuit with the motor and the thermostat, a clutch device for disconnecting the lever from the motor and for temporarily discontinuing the control of the thermostat over the motor by operating the switch to short-circuit the thermostat, said switch having provisions to prevent the short-circuiting of the thermostat until the clutch device has completely disengaged the lever from the motor.

6. In combination with a motor, a work performing connection therefor adapted to be actuated by the motor, a manually operable push button having an operable part adapted to release said connection from the control of said motor for independent operation of said connection, said operable part being movable relative to said work performing connection, and means for automatically restoring the control of said motor over said work performing connection.

7. An automatically operated damper control comprising in combination a casing member adapted to have gas pass therethrough, a movably mounted damper member for regulating the flow of gas through the casing member, means for shifting the damper member into different positions embodying a motor, a drive connecting the damper member and motor and a thermostatically controlled switch, and means for temporarily disconnecting the damper member and motor for independent operation of the damper member and for restoring thereafter the control of the damper member by the motor including a shaft and contacts on the shaft for controlling the operation of the motor after the drive is disconnected.

8. An automatically operated damper control comprising in combination a casing member adapted to have gas pass therethrough, a movably mounted damper member for regulating the flow of gas through the casing member, means for shifting the damper member into different positions including a motor, a drive between the damper member and the motor and a thermostatically controlled switch, and means for temporarily disconnecting said drive for independent operation of the damper member including a manually operable shaft or the like, clutch elements actuable by said shaft and forming part of said drive, contacts on said shaft, and a stationary contact adapted for engagement with said contacts on said shaft, the operation of said shaft effecting said engagement between said contacts whereby the control of said damper by said motor may be automatically restored.

JOHN S. BAKER.